United States Patent [19]

Freitas et al.

[11] Patent Number: 5,237,671

[45] Date of Patent: Aug. 17, 1993

[54] TRANSLATION LOOKASIDE BUFFER SHUTDOWN SCHEME

[75] Inventors: Danny L. Freitas, San Jose; Craig C. Hansen, Mountain View; Christopher Rowen, Santa Cruz, all of Calif.

[73] Assignee: Silicon Graphics, Inc., Mountain View, Calif.

[21] Appl. No.: 366,344

[22] Filed: Jun. 14, 1989

Related U.S. Application Data

[63] Continuation of Ser. No. 859,075, May 2, 1986, abandoned.

[51] Int. Cl.[5] .................... G06F 12/16; G06F 13/00; G06F 13/16
[52] U.S. Cl. ................................. 395/425; 395/725; 364/243; 364/243.41; 364/DIG. 1
[58] Field of Search ... 364/200 MS File, 900 MS File; 371/10.2; 395/400, 425, 725

[56] References Cited

U.S. PATENT DOCUMENTS

| | | | |
|---|---|---|---|
| 3,723,976 | 3/1973 | Alvarez et al. | 340/172.5 |
| 3,800,286 | 3/1974 | Brown et al. | 395/400 |
| 3,979,726 | 9/1976 | Lange et al. | 364/200 |
| 4,050,097 | 9/1977 | Miu et al. | 364/200 |
| 4,068,303 | 1/1978 | Morita | 364/200 |
| 4,190,885 | 2/1980 | Joyce et al. | 364/200 |
| 4,217,640 | 8/1980 | Porter et al. | 364/200 |
| 4,264,953 | 4/1981 | Douglas et al. | 364/200 |
| 4,268,907 | 5/1981 | Porter et al. | 364/200 |
| 4,298,929 | 11/1981 | Capozzi | 364/200 |
| 4,323,968 | 4/1982 | Capozzi | 364/200 |
| 4,332,010 | 5/1982 | Messina et al. | 364/200 |
| 4,357,656 | 11/1982 | Saltz et al. | 364/200 |
| 4,363,095 | 12/1982 | Woods et al. | 364/200 |
| 4,370,710 | 1/1983 | Kroff | 364/200 |
| 4,376,297 | 3/1983 | Anderson et al. | 364/200 |
| 4,381,541 | 4/1983 | Baumann, Jr. et al. | 364/200 |
| 4,386,402 | 5/1983 | Toy | 364/200 |

(List continued on next page.)

FOREIGN PATENT DOCUMENTS 0127008 12/1984 European Pat. Off. .

OTHER PUBLICATIONS

Strecker, "Cache Memories for PDP-11 Family Computers," in Bell, *Computer Engineering* (Digital Press), at 263-67.

DeMoney, "Operating System Support on a RISC," *Proceedings, 1986 COMPCON IEEE*, pp. 138-143.

Moussouris, et al., "A CMOS RISC Processor With Integrated System Functions," *Proceedings, 1986 COMPCON IEEE*, pp. 132-137.

Chow, F., "Engineering a RISC Compiler System," *Proceedings, 1986 COMPCON IEEE*, pp. 132-137.

Rowen, C., "RISC VLSI Design For System-Level Performance", *VLSI Systems Design*, vol. 7, pp. 81-88 (1986).

IBM Technical Disclosure Bulletin, vol. 27, No. 2 Jul., 1984 pp. 1128-1130.

IEEE Journal of Solid-State Circuits, vol. SC-20 No. 6 Dec., 1985 pp. 1277-1282.

*Primary Examiner*—Joseph L. Dixon
*Assistant Examiner*—Michael A. Whitfield
*Attorney, Agent, or Firm*—Townsend and Townsend Khourie and Crew

[57] ABSTRACT

Apparatus for temporarily disabling a translation lookaside buffer in a computer system upon the occurrence of certain predefined system conditions. Such conditions may be of a first type which have been predetermined to indicate a greater risk that two or more virtual addresses stored in the TLB will simultaneously match the incoming virtual address, and/or of a second type in which access to the TLB is not needed. An example of the first type is a reference to an unmapped segment of memory. An example of the second type is the processing of a non-memory-access instruction. The apparatus may further include failsafe circuitry to shut down the TLB if at least a given number of matches occur at any time and for any reason, the given number being greater than 1. The apparatus prevents loss of data or damage to the chip where match comparisons are performed in parallel.

11 Claims, 3 Drawing Sheets

U.S. PATENT DOCUMENTS

| | | | |
|---|---|---|---|
| 4,392,200 | 7/1983 | Arulparagasam et al. | 364/200 |
| 4,395,758 | 7/1983 | Helenius et al. | 364/200 |
| 4,400,770 | 8/1983 | Chan et al. | 364/200 |
| 4,400,774 | 8/1983 | Toy | 364/200 |
| 4,439,829 | 3/1984 | Tsiang | 364/200 |
| 4,459,656 | 7/1984 | Wilder, Jr. | 364/200 |
| 4,464,712 | 8/1984 | Fletcher | 364/200 |
| 4,464,717 | 8/1984 | Keeley et al. | 364/200 |
| 4,470,110 | 9/1984 | Chiarottino et al. | 364/200 |
| 4,473,878 | 9/1984 | Zolnowsky et al. | 364/200 |
| 4,482,952 | 11/1984 | Akagi | 364/200 |
| 4,493,026 | 1/1985 | Oinowich | 364/200 |
| 4,513,371 | 4/1985 | Celio | 364/200 |
| 4,521,849 | 6/1985 | Wilder, Jr. | 364/200 |
| 4,521,850 | 6/1985 | Wilhite et al. | 364/200 |
| 4,521,851 | 6/1985 | Trubisky et al. | 364/200 |
| 4,538,243 | 8/1985 | Zehner | 365/49 |
| 4,561,071 | 12/1985 | Hashimoto et al. | 365/230 |
| 4,567,578 | 1/1986 | Cohen et al. | 365/189 |
| 4,581,577 | 4/1986 | Newosad et al. | 324/66 |
| 4,740,889 | 4/1988 | Motersole et al. | 364/200 |
| 4,812,969 | 3/1989 | Takagi et al. | 364/200 |

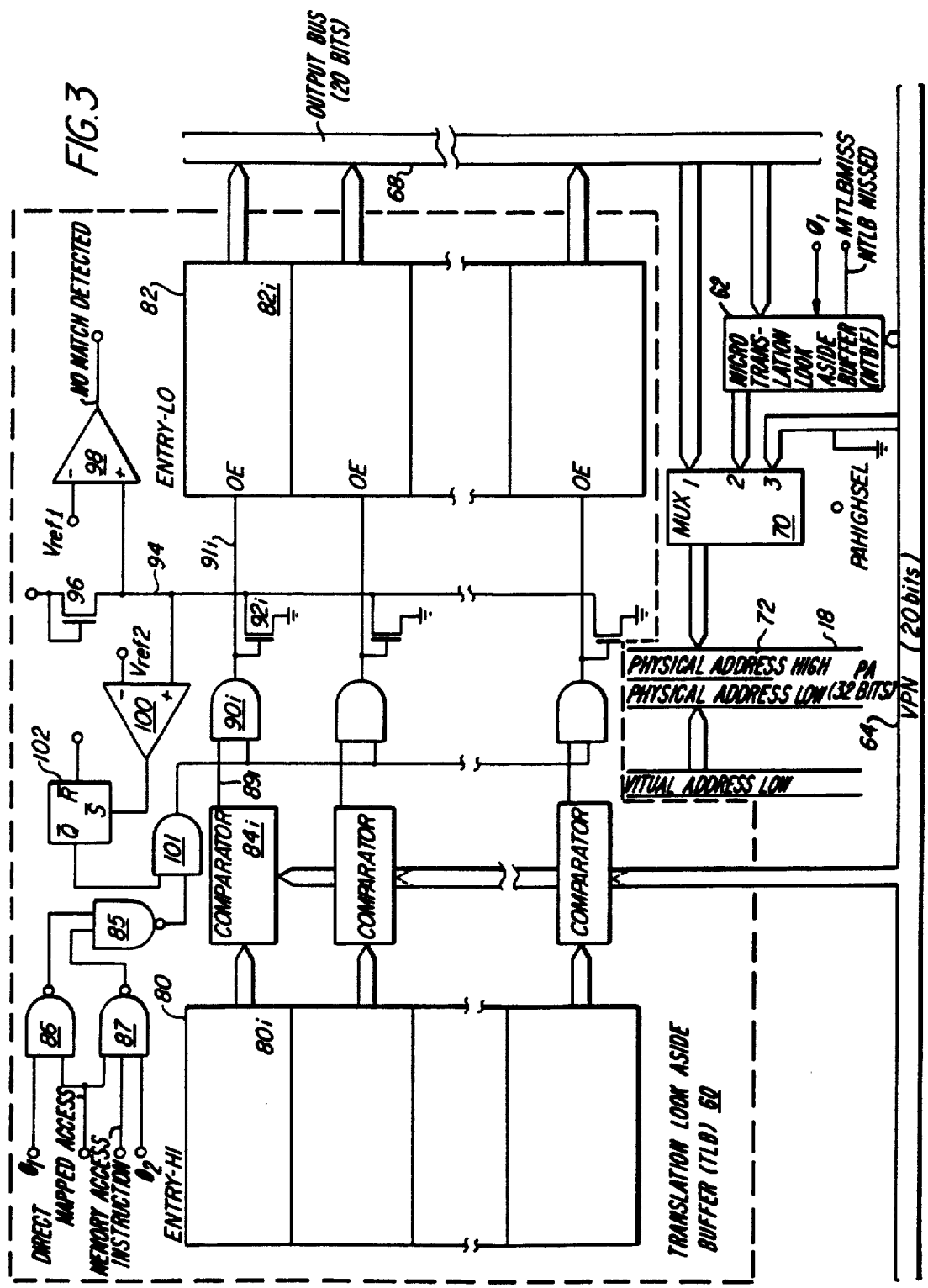

TRANSLATION LOOKASIDE BUFFER SHUTDOWN SCHEME

This is a continuation of co-pending application Ser. No. 859,075 filed on May 2, 1986, now abandoned.

BACKGROUND

1. Field of the Invention

The invention relates to translation lookaside buffers for a computer system using virtual addressing, and more particularly to means for preventing damage to the translation lookaside buffer which might occur when a virtual address is found in more than one TLB entry.

2. Description of Related Art

LSI CPU chips or chip sets which use virtual addressing schemes require a page table for conversion of virtual addresses (VA) generated by the CPU to real addresses (RA) (also called physical addresses (PA)) usable by external devices (such as main memory or peripherals). The page table may be located in main memory or in separate storage, and may be made accessible to the hardware, the operating system, or both. In order to speed up the address conversion process, CPUs frequently include a translation lookaside buffer (TLB), which is a small cache memory which stores the several most recently used virtual addresses and their corresponding real addresses. A general description of cache memories may be found in Strecker, "Cache Memories for PDP-11 Family computers," in Bell, *Computer Engineering* (Digital Press), at 263-67. As can be seen, caches can be organized in several alternative ways. A direct mapped cache comprises a high speed data RAM and a parallel high speed tag RAM. The location address of each entry in the cache is the same as the low order portion of the main memory address to which the entry corresponds, the high order portion of the main memory address being stored in the tag RAM. Thus, if main memory is thought of as $2^m$ blocks of $2^n$ words each, the i'th word in the cache data vector will be a copy of the i'th word of one of the $2^m$ blocks in main memory. The identity of that block is stored in the i'th location in the tao vector. When the CPU requests data from memory, the low order portion of the address is supplied as an address to both the cache data and tag vectors. The tag for the selected cache entry is compared with the high order portion of the CPU's address and, if it matches, the data from the cache data vector is enabled onto the output bus. If the tag does not match the high order portion of the CPU's address, then the data is fetched from main memory. It is also placed in the cache for potential future use, overwriting the previous entry.

In the context of a TLB, the "main memory" being accessed is the page table; the "data" in the data vector is a real or physical address, and the "address" supplied by the CPU is a virtual address. Thus, for a direct mapped TLB, the low order portion of the virtual address is supplied as an address to both the TLB data vector (also called the real address (RA) or physical address (PA) vector), and the TLB tag vector. The tag in the selected TLB entry is compared with the high order portion of the virtual address from the CPU, and if it matches, the physical address in the PA vector is enabled onto the output bus for further use within the computer. If it does not match, the physical address is obtained from the full page table.

Another cache organization usable in the TLB context is called "two way set associative." In this organization, a second pair of tag and data vectors (tag and PA vectors) are placed alongside the first pair and accessed in parallel therewith. Thus, when the CPU provides a virtual address, the corresponding physical address may be found in either or both of the pairs. The determination can be made serially by a single match comparator, by comparing the high order portion of the virtual address to each of the two tags in sequence; or it can be made in parallel by two match comparators, each of which compares the high order portion of the virtual address to one of the two tags. In either case, if one of the tags matches, the corresponding physical address is enabled onto the output bus for further use within the computer. If neither matches, then the physical address is fetched from the page table. If both match, which should not occur in the normal operation of the computer, then some means is used to select one or the other and/or an error condition is signaled. The concept of set associativity can be extended to cover any number of tag/data (tag/PA) pairs, a type of organization referred to generically as "n-way set associativity."

Yet another cache organization usable in the TLB context is called "fully associative." This type of organization employs a single tag/data (tag/PA) vector pair, but the location of the tag/data (tag/PA) information in the vectors no longer has any correspondence with its location in main memory (page table). Rather, the information may be found in any location in the vector pair. No portion of the address from the CPU is used as an address to the vector pair; instead, the entire address is compared to all the tags in the vector. As with n-way set associative caches, the comparison may be performed serially or in parallel (or by some combination of those two methods). If a match is found with one tag, the corresponding information in the data (PA) vector is enabled onto the output bus for further use within the system. If no match is found, the data (PA) is obtained from main memory (or the full page table). If more than one tag matches, which, again, should not ordinarily occur, then some means is used to select the data (PA) corresponding to one of the matching tags and/or an error condition is signaled.

The invention relates specifically to cache and TLB organizations in which a given address can be found in more than one location in the cache or TLB, and more specifically to those organizations in which the match comparison is performed, at least in part, in parallel. Systems using these organizations run the risk that more than one match comparator operating in parallel will detect a match, and thereby enable more than one word of data (more than one physical address) onto the same output bus. If it happens that the different words of data (physical addresses) contain different information, excessive current flow could be created through the conflicting output transistors. This can cause, at best, loss of data, and at worst, physical damage to the chip.

One solution to this problem might be to add logic between the parallel match comparator outputs and the enable inputs to ensure that only one word of data (only one physical address) is ever enabled onto the output bus at one time. This additional layer of logic adds unwanted delay, especially if it operates by a ripple effect.

Another solution, disclosed in U.S. Pat. No. 4,473,878 to Zolnowsky, might be to prevent the storage of conflicting data initially. This solution does not reduce delay because it merely moves the comparison step to the data storage portion of the cycle. Additionally, it does not handle the situation existing on power-up, in which the data in any memory is random.

Another solution to this problem might be merely to have the software ensure that conflicting data is never stored in the cache or TLB. This is undesirable, however, because it requires every system programmer to be aware of the risk and expend effort and time avoiding it. There is also the possibility that the software will contain errors which have not been detected prior to execution. Moreover, the software cannot control the contents of the cache on power-up, in which the cache is typically filled with random data.

In U.S. Pat. No. 4,357,656 to Saltz, there is described a scheme for disabling part or all of a cache memory for the purpose of diagnostics on the cache. It comprises an ordinary direct mapped cache memory, with the addition of a cache control logic. Under microcode control, the cache control logic can be put into any of four modes: disable entire cache, disable none of the cache, disable top half, or disable bottom half. When diagnostics are to be performed, the cache control logic is first put into the appropriate mode. The cache control logic then compares each memory access address in conjunction with the mode stored therein, and forces, if appropriate, a "miss" condition regardless of the output of the match comparator.

SUMMARY OF THE INVENTION

It is therefore an object of this invention to provide a scheme for avoiding some or all of the above problems.

It is another object of the present invention to provide a scheme for preventing chip damage or data loss which may otherwise occur if a TLB has multiple identical entries stored therein.

It is another object of the present invention to increase the speed and density of caches or TLBs in which match comparisons take place in parallel.

It is another object of the present invention to propose a novel protection scheme for a fully associative TLB.

The above objects and others are accomplished according to the invention by detecting certain predefined conditions occurring in the normal operation of the system, and disabling the cache or TLB whenever such a condition is detected. That is, if one of the predefined conditions is detected, circuitry is activated which inhibits the cache or TLB from placing any data onto the output bus. Such inhibition need not take place immediately, but should take place soon enough that data loss and/or chip damage is prevented. Additionally, whereas no harm would occur if not more than one preselected entry is enabled onto the output bus despite the occurrence of the predetermined conditions, any benefit which might accrue from such a feature might not be sufficient to overcome the difficulties in taking advantage of that benefit.

For example, in the TLB context, protection circuitry may be incorporated which disables the TLB upon occurrence of either of the following two conditions: (1) the virtual address from the CPU is within a range that requires no page table lookup. That is, certain portions of main memory are predesignated as "unmapped" or "direct mapped" memory, meaning the virtual address is either always the same as the physical address, or always translatable into the physical address according to a relatively simple formula. If the virtual address from the CPU is within direct mapped memory, the TLB is disabled; (2) the current instruction is not a memory access instruction. The CPU may generate random addresses during execution of instructions which do not access memory, such as register to register instructions. The protection circuitry may disable the TLB when these instructions are being executed.

A shutdown scheme according to the invention may additionally include a failsafe mechanism to protect the chip in situations not covered by the predetermined conditions. In the TLB context, the failsafe mechanism may disable the TLB whenever more than about five tag comparators simultaneously indicate a match. Specific circuitry implementing this mechanism will be described in more detail below.

BRIEF DESCRIPTION OF THE DRAWINGS

The invention will be described with respect to specific embodiments thereof, and reference will be made to the drawings, in which:

FIG. 3 shows an address translation unit incorporating aspects of the present invention.

DETAILED DESCRIPTION

The present invention has been embodied in a system designed by the assignee of the present application, which system is described in the following articles: DeMoney, et. al., "Operating System Support on a RISC," *Proceedings,* 1986 *COMPCON, IEEE,* pp. 138–143; Moussouris, et. al., "A CMOS RISC Processor with Integrated System Functions," *Proceedings,* 1986 *COMPCON, IEEE,* pp. 126–131; Chow, F., et. al., "Engineering a RISC Compiler System," *Proceedings,* 1986 *COMPCON, IEEE,* pp. 132–137; Rowen, et. al., "RISC VLSI Design for System-Level Performance," *VLSI Systems Design ,* Vol. 7, pp. 81–88 (1986). These articles are hereby incorporated herein by reference.

Figure 1:
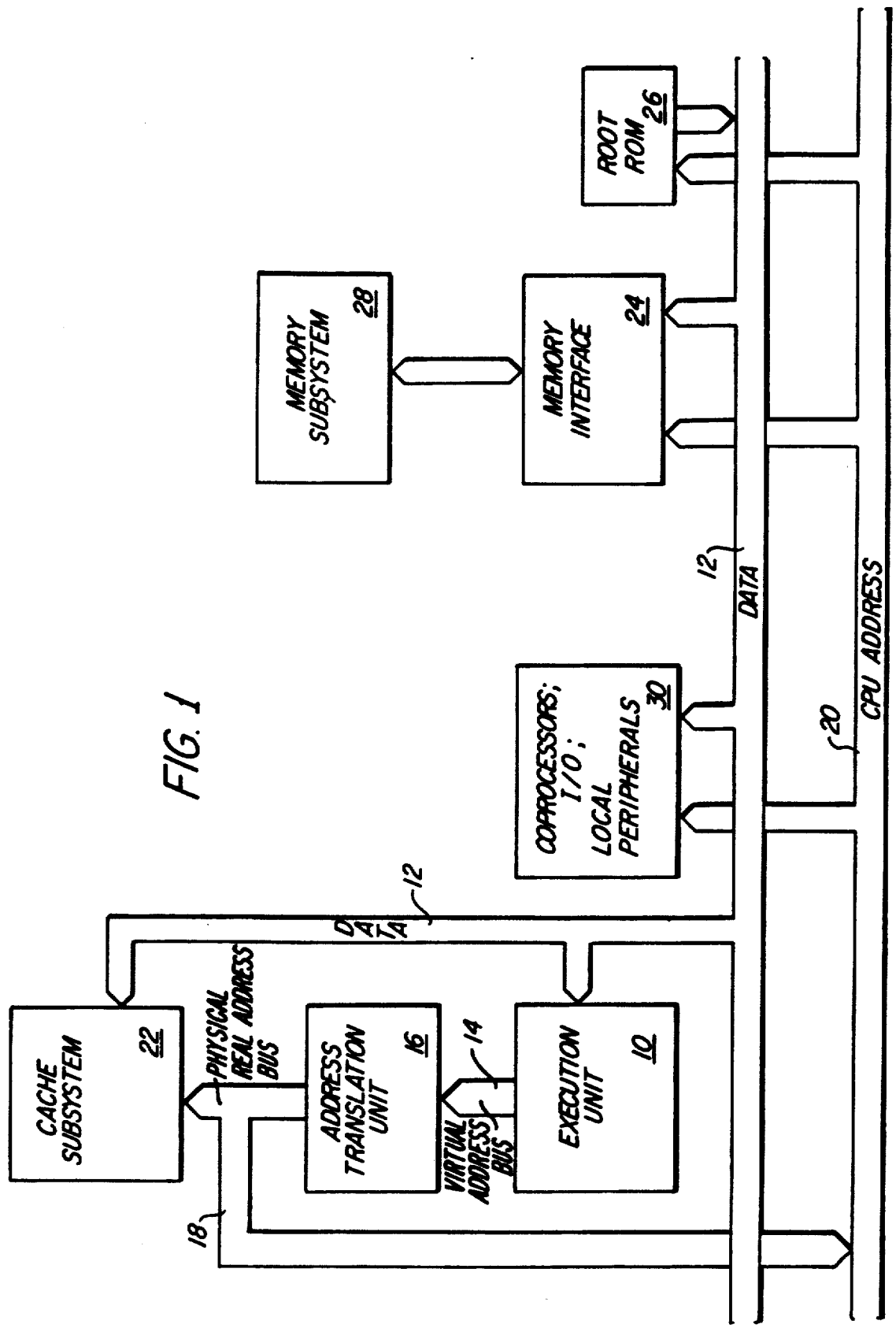
FIG. 1 is a block diagram of a computer system.

FIG. 1 shows an overall block diagram of the computer. It comprises an execution unit 10, which has a bidirectional interface to a data bus 12. The execution unit 10 also generates virtual addresses which it provides via a Virtual Address (VA) bus 14 to an Address Translation Unit 16. The Address Translation Unit 16 converts incoming virtual addresses to physical addresses and outputs them on a Physical Address bus 18 (PA). The Physical Address bus is connected to a CPU address bus 20, and also to a cache subsystem 22. The cache subsystem 22 includes a data cache and a separate instruction cache (not shown individually) for separately caching instruction and data streams. The cache subsystem 22 is also bidirectionally connected to the data bus 12. The CPU address bus 20 can provide addresses to a memory interface 24 and to a boot ROM 26. The boot ROM 26 can place data on the data bus 12. The memory interface 24 is further connected to a memory subsystem 28 which includes both main memory and private memory (not shown individually). Also connected to the data bus 12 and CPU address bus 20 may be coprocessors, input/output devices and other local peripherals. These are all shown in the diagram of FIG. 1 as 30. The computer also includes numerous control leads (not shown in FIG. 1).

Figure 2:
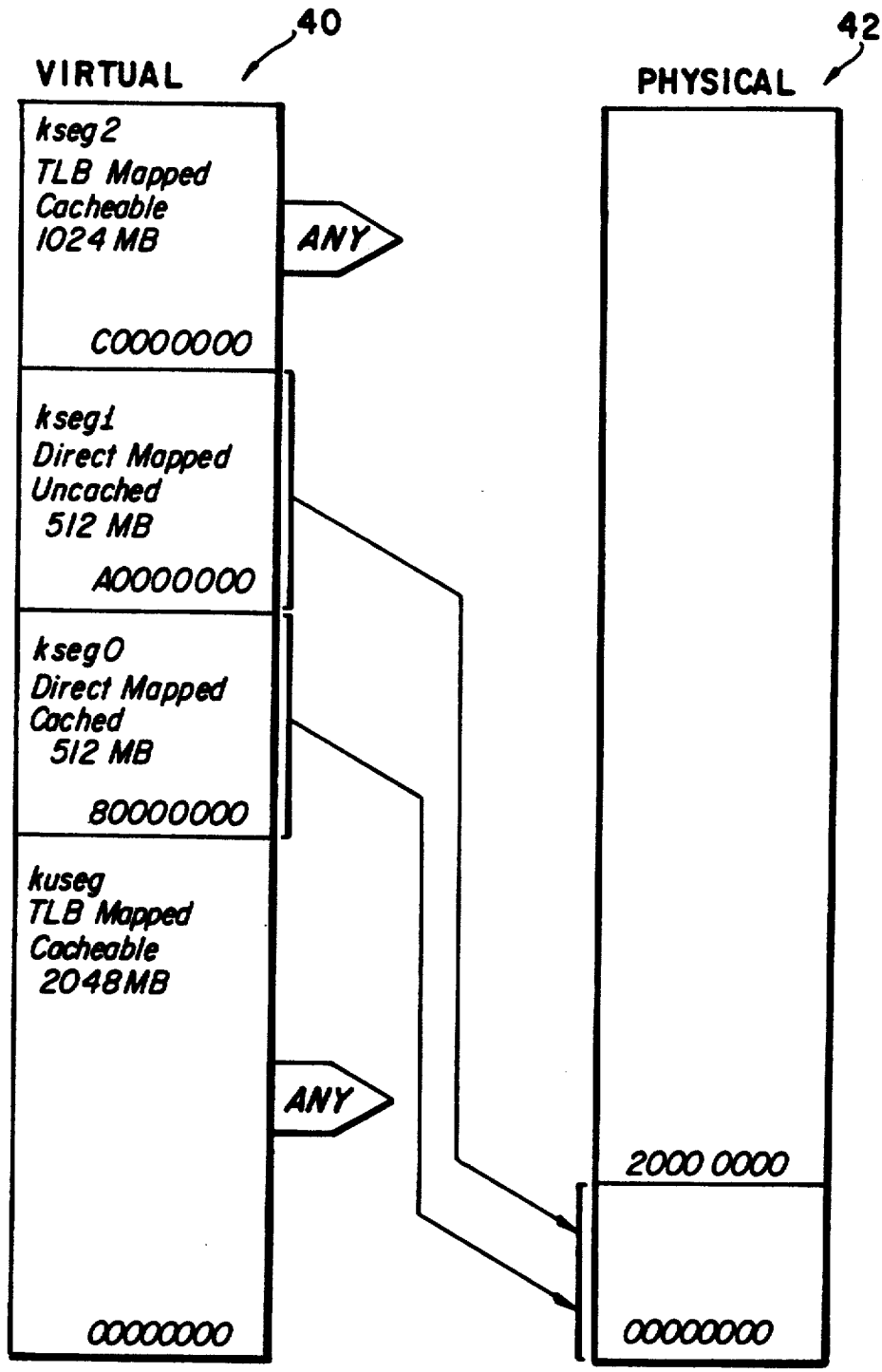
FIG. 2 shows the virtual to physical page mapping for the computer of FIG. 1.

Before describing the inventive portion of the embodiment in greater detail, it will be useful to describe the addressing scheme used. As shown in FIG. 2, the embodiment uses a 4 GByte virtual address space 40 which maps onto a 4 GByte physical address space 42. The virtual address space is divided into four segments. The user segment, denoted kuseg is a 2 GByte segment located from byte address 0 through 7FFF FFFF. Kuseg is TLB mapped into any portion of the physical address space and is cacheable at the option of software. Kseg0, a 512 MByte space used by the kernal, is located from address 8000 0000 through 9FFF FFFF. Kseg0 is cached and directly mapped onto addresses 0000 0000 through 3FFF FFFF of the physical address space. The only address translation which should take place on a memory reference to kseg0 is the forcing of 0's in the high order three bits of the 32-bit address. Kseg1 is identical to kseg0, and mapped into the same physical address region as Kseg0, except that is is uncached. Kseg1 is used for I/O registers and the boot ROM, for disk buffers, and for other code or data whose usage slows down caching. Kseg2 is a 1 GByte segment located at C000 0000 through FFFF FFFF, and is cacheable and TLB mapped onto any region of physical memory.

FIG. 3 shows address translation unit 16 in detail. It is divided into a fully associative 64-entry TLB 60 and a fully associative 2-entry micro-TLB (MTLB) 62. The MTLB 62 is used only for instruction fetches, whereas the TLB 60 is used both for data references and as a second level cache for the MTLB 62 on instruction fetches. Both the TLB 60 and the MTLB 62 are connected on their inputs to a 20-bit virtual page number (VPN) bus 64, which constitutes the high-order 20-bits of the VA bus 14 shown in FIG. 1.

The output of the TLB 60 is connected to a 20-bit TLBOUT bus 68, which is connected to a first input of a multiplexer (MUX) 70. The output of the MTLB 62 is connected to a second input of the MUX 70. A third input of the MUX 70 has its low order 17 bits connected to the low order 17 bits of VPN bus 64, and its high order three bits connected to ground. This third input is used for direct mapped addressing. The TLBOUT bus 68 is also connected to the MTLB 62 for refilling the MTLB 62 in the event of an MTLB miss condition. The TLB 60 is refilled on a TLB miss condition under software control from the VPN bus 64 via a path not shown. The output of the MUX 70 is connected to a 20-bit PAHIGH bus 72, which forms the high-order portion of physical address (PA) bus 18 shown also in FIG. 1. PALOW, the low order portion of PA bus 18, is connected to the 12 low order bits of VA bus 14.

The TLB 60 comprises an array of 64 entries, each comprising an ENTRY-HI portion 80 and an ENTRY-LO portion 82. The ENTRY-HI portion $80_i$ of any individual entry holds a virtual page number for matching with the virtual page number on VPN bus 64, and may further include a process ID (PID) for matching with the contents of a PID register (not shown) which may also be incorporated in the TLB 60. The inclusion of a PID register would permit the TLB 60 to hold address translation information for different processes even if more than one of such processes are continually addressing data in physical address regions which are mapped from the same virtual address region.

The ENTRY-LO portion $82_i$ of each individual entry holds the physical page number corresponding to the virtual page number in the corresponding ENTRY-HI portion $80_i$. The ENTRY-LO portion $82_i$ may also contain additional status bits, such as a valid bit, a global bit or other bits not important to the invention. Each individual ENTRY-HI portion $80_i$ is connected on its output to one input of a comparator $84_i$. There are 64 such comparators $84_i$, so match comparison is performed entirely in parallel. The second input of each of the comparators $84_i$ is connected to the VPN bus 64. Each comparator $84_i$ generates an output signal on a match line $89_i$ which is either high if the information in ENTRY-HI portion $80_i$ matches the information on VPN bus 64, or low if it does not. Each match line $89_i$ is connected to one input of a corresponding AND gate $90_i$, the output of which (lead $91_i$) is connected to an output enable of the corresponding ENTRY-LO portion $82_i$. Thus, assuming the second input of AND gate $90_i$ (the purpose of which will be described below) is high, then the physical page number in each individual ENTRY-LO portion $82_i$ of TLB 60 will be enabled onto the TLBOUT bus 68 if the information in the corresponding ENTRY-HI portion $80_i$ matches the information on VPN bus 64.

In addition to being connected to the output enable of an ENTRY-LO portion $82_i$, each lead $91_i$ is also connected to the gate of a corresponding MOSFET $92_i$. The sources of all the MOSFETS $92_i$ are connected to ground, and the drains are all connected to a common pull-down line 94. The pull-down line 94 is connected through a pull-up resistor 96 (which may comprise a MOSFET having its gate connected to its drain or to a reference voltage) to the supply voltage. The pull-down line 94 is also connected to the non-inverting input of an analog comparator 98, the inverting input of which is connected to a voltage reference $V_{ref1}$. $V_{ref1}$ is chosen such that the analog comparator 98 outputs a high level if none of the MOSFETs $92_i$ are active, and a low level if at least one of the MOSFETs $92_i$ are active. Assuming again that the second inputs of all the AND gates $90_i$ are high, the output of analog comparator 98, called NOTLBMATCH, therefore is high when none of the comparators $84_i$ are indicating a match and low when at least one is indicating a match.

In accordance with the invention, the pull-down line 94 is connected further to the non-inverting input of a second analog comparator 100, the inverting input of which is connected to a second voltage reference $V_{ref2}$ lower than $V_{ref1}$. $V_{ref2}$ is chosen such that the output of analog comparator 100 is low only when at least about five of the MOSFETs $92_i$ are active at once. The output of analog comparator 100 is connected to the "set" input of a set/reset flip flop 102 which may be reset only on system power-up. Since the presence of at least about five simultaneous match indications represents a system failure, execution of the system should cease once flip flop 102 has been set. The state of flip flop is available to the software for that purpose. The Q output of flip flop 102 is also connected to one input of a 2-input AND gate 101, the output of which is connected to the second input of each of the AND gates $90_i$. The second input of AND gate 101 is connected to the output of a NAND gate 85. If flip-flop 102 ever becomes active, therefore, the AND gates $90_i$ will all be gated off, thereby quickly inhibiting the output of any information from any ENTRY-LO portion $82_i$ onto the TLBOUT bus 68. The inhibition does not prevent multiple physical addresses from ever being placed on the TLBOUT bus 68 simultaneously, but if that should occur, they will be removed from the bus quickly enough that no damage can occur.

Further in accordance with the invention, the inputs of NAND gate 85 are connected to the outputs of two additional NAND gates 86 and 87, respectively. NAND gate 86 has two inputs, which are connected respectively to a MAPPED signal generated by execution unit 10, for indicating that the memory access is to a mapped region of virtual memory; and to clock phase 1. NAND gate 87 has three inputs, connected respectively to a MEMACC signal generated by the execution unit 10, for indicating that the current instruction is a memory access instruction; to the MAPPED signal; and to clock phase 2. NAND gates 85, 86 and 87 are used to disable the TLB upon the occurrence of certain predefined system conditions.

The operation of the address translation unit 16 will now be described, noting first that the general architecture of the computer is such that instructions are fetched on every phase 1 of a two-phase clock, and memory data references are made on phase 2. On phase 1, the execution unit 10 provides the virtual address for an instruction fetch. The low order 12 bits of the virtual address directly constitute the low order portion of PA bus 18. The high order 20 bits of the virtual address are transmitted via VPN bus 64 to the MTLB 62 and to all 64 of the comparators $84_i$ in TLB 60. The MTLB, the construction and operation of which is conventional, compares the information to the information already stored in its two virtual address registers. If a match is found, the corresponding physical page number is provided to the second input of MUX 70 and a selection signal, PAHIGHSEL, is generated which causes the MUX 70 to output such physical page number onto PA bus 18. If a match is not found, the execution unit 10 enters a stall state while the main TLB 60 attempts to translate the instruction virtual address on the following phase 1. Each of the comparators $84_i$ will compare the virtual address to its corresponding ENTRY-HI portion $80_i$ and output a high level on the corresponding match line $89_i$ if equality is found. Assuming MEMACC and MAPPED are high, and assuming exactly one match has been found, the pull-down line 94 is pulled low by one of the MOSFETs $92_i$. The level of pull-down line 94 is low enough to turn off the NOTL-BMATCH output of analog comparator 98, but not low enough to bring low the output of analog comparator 100. The second inputs of the AND gates $90_i$ are therefore all high, permitting the output enables of ENTRY-LO portions $82_i$ to be governed by the state of the match lines $89_i$. Exactly one of the ENTRY-LO portion $82_i$ therefore places a physical page number on TLBOUT bus 68 and no conflict exists. This physical page number is transmitted to the first input of MUX 70 and the PAHIGHSEL signal is altered (by means not shown) to cause MUX 70 to transmit its first input to PAHIGH bus 72. The physical page number from TLBOUT bus 68 is also written into MTLB 62 at this time for potential future use.

On phase 2, the execution unit 10 provides the address translation unit 16 with virtual addressing information for a data reference. Since this information appears on phase 2, it is ignored by MTLB 62. Instead, only the TLB 60 attempts the translation as described above. Again assuming exactly one match is found, the translated physical page number will be placed on TLBOUT bus 68 and transmitted by the MUX 70 to the PA bus 18.

According to the invention, as previously described, there is no logic in the TLB 60 for ensuring that a match occurring with two or more ENTRY-HI portions $80_i$ will not cause more than one of the ENTRY-LO portions $82_i$ to drive the TLBOUT bus 68 simultaneously. Thus, the TLB 60 includes circuitry to temporarily or permanently "shut itself down" upon the occurrence of certain predefined system conditions. These conditions are selected to generally include the situations most likely to result in multiple matches, such as the initial boot routine activated upon power-up. Multiple matches are a stronger possibility here because the contents of ENTRY-HI portion 80 are random on power-up, not set under any software control. One way to implement this aspect of the invention would be to place the boot ROM in an unmapped region of virtual memory so as to avoid any necessity to use the TLB during boot. The execution unit 10 would generate a "booting" signal upon power-up, which it would clear only upon completion of the boot routine. The "booting" signal would be used to shut down the TLB, preventing any possible enabling of multiple physical page numbers onto the TLBOUT bus 68, and the boot routine itself would include code to write non-identical entries into the ENTRY-HI portion 80 of the TLB 60. Thus, by the time booting is complete, and the booting signal is cleared, there would no longer be a possibility of multiply enabling physical page numbers onto the TLBOUT bus 68, due to random power-up data in the ENTRY-HI portion 80.

The preferred embodiment, however, protects against this source of identical data in a different manner, which also permits greater flexibility in software coding. In the preferred embodiment the boot ROM is located in a direct mapped segment of virtual memory as in the above described embodiment, but the TLB 60 is shut down whenever a memory reference is made to any direct mapped page. This is permissible because the TLB 60 is not needed during such memory references, and it is desirable because it provides an otherwise unavailable method for the software to erase entries from the TLB 60 when necessary. Without this feature, the software would have to select a dummy virtual address or process ID for writing into that entry, taking time to ensure that the dummy virtual address and process ID is not identical to any other virtual address and process ID already stored in the TLB 60 instead, in the preferred embodiment, the software need only write a fixed virtual address into the desired TLB entry, which virtual address was preselected by the programmer to be in direct mapped memory space. Thus, under the preferred embodiment, the software may erase an entry (or even several entries) in the TLB simply by writing a fixed value into those entries. It does not matter that these entries will then contain identical information because they were preselected to be in a direct mapped portion of memory. Because of the way the preferred embodiment protects against the placing of multiple physical addresses onto the TLBOUT bus 68, no match signal based on these entries will ever be presented to the output enable of any ENTRY-LO portion $82_i$.

A second source of multiple identical entries in the ENTRY-HI portion 80 of the TLB 60 is the software. Typically this would occur only if the software contains errors or bugs. However, bug-free software cannot be presumed; the hardware should protect itself in case bugs exist. Obviously the TLB protection scheme cannot take the same broad-brush approach to deal with this source of multiple identical entries that the preferred embodiment takes with respect to random entries on power-up: this would require shutting down whenever any access is made to memory. Instead the preferred embodiment reduces the risk of multiple matches somewhat by shutting down the TLB whenever it is not needed. This occurs when the address being referenced is in a direct mapped region of memory, or when the instruction being executed is not a memory reference instruction at all. The former condition is the same as that sensed to handle the first described source of multiple identical entries, and no additional circuitry is needed to prevent multiple physical page numbers from being placed on the TLBOUT bus 68 during the presence of such condition. The latter condition arises because unless somehow prevented, the TLB 60 attempts a translation of whatever information is on VPN bus 64 at the beginning of each clock phase. Many instructions are not memory access instructions, and the information present on such buses during phase 2 is either random or intended for an entirely different purpose. This information is just as likely as any other to constitute a virtual address which happens to match multiple TLB entries placed there by erroneous software. On the theory that any reduction in the number of TLB address translations is an improvement as long as other parts of the system do not suffer, the preferred embodiment shuts down the TLB on phase 2 whenever the instruction being executed is not a memory access instruction.

A system according to the invention may also include a failsafe portion in the TLB protection circuitry which shuts down the TLB if, despite all other portions of the protection circuitry, more than one match line 88$_i$ becomes active. This circuitry does not depend on any system condition; rather, it operates by directly sensing the occurrence of multiple matches. Since the failsafe portion is activated only on some unknown and unanticipated event, any TLB shutdown based thereon may be made permanent until the next power-up reset in order to avoid chip damage. In the preferred embodiment, the presence of about five simultaneous matches will activate the failsafe portion, and the shutdown is permanent. The choice of the number 51 represents a tradeoff between the desirability of detecting as few as possible matches greater than one, and the need to avoid noisy regions of operation.

The invention as use din the preferred embodiment therefore has three aspects: (1) temporary shutdown of the TLB on unmapped address references; (2) temporary shutdown of the TLB on phase 2 only, if the current instruction is not a memory access instruction; and (3) permanent shutdown of the TLB if at least about five matches are detected at the same time. These three aspects of the TLB shutdown scheme are implemented in the preferred embodiment as follows. First, when the execution unit 10 generates a virtual address, combinational circuitry (not shown) generates an accompanying MAPPED signal for indicating whether the virtual address is in a mapped or unmapped (direct mapped) region of memory. This signal is generated on both clock phases, since both instructions and data may appear in mapped or unmapped regions of memory. Both clock phases are gated by the MAPPED signal (phase 1 by NAND gate 86 and phase 2 by NAND gate 87) and the results are NANDed (by NAND gate 85) together. The resulting signal is used to gate (AND gates 90$_i$) the match lines 89$_i$ before they reach the output enables of ENTRY-LO portions 82$_i$. Therefore, none of the output enables will ever be activated due to a memory reference to an unmapped region of memory. Also, if MAPPED is inactive, PAHIGHSEL is altered such that MUX 70 selects the direct mapped address for presentation to PA bus 18.

The second aspect of the shutdown scheme is implemented similarly to the first. Combinational logic in the execution unit 10 decodes the opcode of the current instruction and generates a MEMACC signal which indicates whether the instruction is a memory access instruction. The MEMACC signal gates only clock phase 2 (via NAND gate 87), because instruction fetches, which are the only pertinent events occurring on clock phase 1, always require a memory access. Phase 2 is therefore gated by both MAPPED and MEMACC, and both must be active for any of the leads 91$_i$ to be activated on phase 2. Analog comparator 100, flip flop 102, MOSFETs 92$_i$, AND gates 90$_i$ and AND gate 101 implement the third, failsafe, aspect of the shutdown scheme. If, at any time or for any reason, a lead 91$_i$ is active, the corresponding MOSFET 92$_i$ will also be turned on. The dimensions of all the MOSFETs 92$_i$ are similar, and are chosen such that their "on" resistances are on the order of the resistance of the pull-up component 96. The "on" MOSFETs 92$_i$ therefore act as a resistor divider network in combination with the pull-up component 96. Thus, the voltage of the pull-down line 94 at any time is determined by the number of MOSFETs 92$_i$ which are in their "on" state. For example, assuming each MOSFET 92$_i$ has an "on" resistance R, as does pull-up component 96, the voltage of the pull-down line 94 will be at some value $V_0$ if none of the MOSFETs 92$_i$ are on. If one is on, the voltage of the pull-down line 94 will be $V_1 = V_0/2$. If n are on, the voltage will be $V_n = V_0/(n+1)$. The analog comparator 98 distinguishes easily between the voltages present when none or one of the MOSFETs 92$_i$ are on, since it need only distinguish between $V_0$ and $V_0/2$, respectively. It is more difficult to sense two active MOSFETs 92$_i$ and distinguish it from only one active MOSFET 92$_i$, because a smaller voltage difference ($V_0/2 - V_0/3$) is involved. This voltage difference is small enough to risk activation of the failsafe circuitry by noise. Therefore, analog comparator 100 is made only to distinguish one active MOSFET 92$_i$ from about five. The voltage difference ($V_0/2 - V_0/6$) is larger and easier to detect without incurring problems with noise.

If analog comparator 100 does detect the appointed number of MOSFETs active, indicating that more than one match has been detected despite other aspects of the protection scheme, the comparator 100 outputs a low level which sets the flip flop 102. The output of flip flop 102 also gates all the match lines 89$_i$ (via AND gate 101 and AND gates 90$_i$) and inhibits any of them from enabling any information onto the TLBOUT bus 68. The presence of multiple matches is thereby prevented from causing any physical damage to the chip.

The invention has been described with respect to specific embodiments thereof, and it will be understood that numerous variations may be made within the scope of the invention.

What is claimed is:

1. A computer system comprising:
   an execution unit for generating data request instructions including address instructions;
   memory means for generating data in response to said data request instructions, said memory means including data storage means for holding data groups, an output enable a plurality of address means for holding addresses, each address means being associated with a data group, comparing means for comparing an address instruction with addresses in said address means, said comparing means generating a match signal for each match between an address instruction and addresses in said plurality of address means, said comparing means activate the output enable to output a data group in response to generation of at least one match signal; and detection means for detecting a preselected number of match signals generated by said comparing means in response to a comparison between said address instruction and addresses in said plurality of address means, said detection means generating a disabling signal for disabling activation of the output enable of said memory means in the presence of the detection of the preselected number of match signals.

2. A computer system comprising:
an input bus;
an output bus;
a cache memory including:
- a plurality of tag registers;
- means for storing tags into said tag registers;
- a plurality of comparator means for generating match signals, each one of said plurality of comparator means activating a match signal and outputting said match signal on one of a plurality of match signal lines if the contents of a corresponding tap register matches an incoming tag signal from said input bus;
- a plurality of output means, each one of said plurality of output means outputting a data signal on said output bus in response to a corresponding match signal from one of said plurality of comparator means;
- a pull down signal line coupled to each of said plurality of match signal lines; and
- detection means for generating an inhibiting signal coupled to said pull down signal line, the detection means generating the inhibiting signal in the presence of a signal level on said pull down signal line corresponding to a preselected number of match signals;
- said plurality of comparator means being disabled by said inhibiting signal whereby said cache memory is disabled.

3. The computer system of claim 2 wherein said cache memory is a translation lookaside buffer.

4. The computer system of claim 2 further comprising a main memory having a direct access region for accessing data which is accessed through direct instructions, and another region for accessing data through said cache memory, an execution unit for generating direct instructions for accessing data in said direct region, wherein said cache memory is disabled in the presence of said direct instructions.

5. A computer system comprising:
an input bus;
an output bus;
a cache memory including:
- a plurality of tag registers;
- means for storing tags into said tag registers;
- a plurality of first comparator means for generating match signals, each one of said plurality of first comparator means activating a match signal having a first predetermined signal level if the contents of a corresponding tag register matches an incoming tag signal from said input bus; and
- a plurality of output means, each one of said plurality of output means outputting a data signal on said output bus in response to a corresponding match signal from one of said plurality of first comparator means; and
- detection means for generating an inhibiting signal when a presselected number of match signals are generated by said plurality of first comparator means, and when said preselected number of match signals are combined in said detection means to produce a combined match signal having a second predetermined signal level;
- said plurality of first comparator means being disabled by said inhibiting signal.

6. A computer system comprising:
an input bus;
an output bus;
a cache memory including:
- a plurality of tag registers;
- means for storing tags into said tag registers;
- a plurality of comparator means for generating signals, each one of said plurality of comparator means activating a match signal having a first predetermined signal level and outputting said match signal on one of a plurality of match signal lines if the contents of a corresponding tag register matches an incoming tag signal from said input bus;
- a plurality of output means, each one of said plurality of output means outputting a data signal on said output bus in response to a corresponding match signal from one of said plurality of comparator means;
- detection means for generating an inhibiting signal coupled to each of said plurality of match signal lines, the detection means generating the inhibiting signal in the presence of a second predetermined signal level corresponding to a combination of a preselected number of match signals;
- said plurality of comparator means being disabled by said inhibiting signal whereby said cache memory is disabled;
a main memory; and
an execution unit for generating memory access signals for accessing said data from said main memory and said cache memory, and non-accessing instructions for other tasks, wherein said cache memory is disabled in the presence of said non-accessing instructions.

7. A computer system comprising:
an input bus;
an output bus;
a cache memory including;
- a plurality of tag registers;
- means for storing tags into said tag registers;
- a plurality of first comparator means for generating match signals, each one of said plurality of first comparator means activating a match signal having a first predetermined signal level and outputting said match signal on one of a plurality of match signal lines if the contents of a corresponding tag register matches an incoming tag signal from said input bus;
- a plurality of output means, each one of said plurality of output means outputting a data signal on said output bus in response to a corresponding match signal from one of said plurality of first comparator means;

detection means for generating an inhibiting signal coupled to each of said plurality of match signal lines, the detection means generating the inhibiting signal when said detection means detects a second predetermined signal level corresponding to a combination of a preselected number of match signals generated by said plurality of first comparator means;

said plurality of first comparator means being disabled by said inhibiting signal;

said detection means comprising a plurality of switching members, each one of said plurality of switching members being connected to one of said plurality of first comparator means and having a switching member output; and second comparator means having one comparator input connected to said switching member outputs, and another comparator input connected to a reference voltage source.

8. The computer system of claim 7 further comprising a main memory having a direct access region for accessing data which is accessed through direct instructions, and another region for accessing data through said cache memory, an execution unit for generating direct instructions for accessing data in said direct region, wherein said cache memory is disabled in the presence of said direct instructions.

9. The computer system of claim 8 wherein said detection means includes a plurality of gating means, each one of said plurality of gating means having one input connected to one of said plurality of output means and another input for receiving said direct instructions, said detection means also coupled to said output bus.

10. A computer system comprising:
an input bus;
an output bus;
a cache memory including:
a plurality of tag registers;
means for storing tags into said tag registers;
a plurality of first comparator means for generating match signals, each one of said plurality of first comparator means activating a match signal having a first predetermined signal level and outputting said match signal on one of a plurality of match signal lines if the contents of a corresponding tag register matches an incoming tag signal from said input bus;
a plurality of output means, each one of said plurality of output means outputting a data signal on said output bus in response to a corresponding match signal from one of said plurality of first comparator means;
detection means for generating an inhibiting signal coupled to each of said plurality of match signal lines, the detection means generating the inhibiting signal when said detection means detects a second predetermined signal level corresponding to a combination of a preselected number of match signals generated by said plurality of first comparator means;
said plurality of first comparator means being disabled by said inhibiting signal;
a main memory; and
an execution unit for generating memory access instructions for accessing said data from said main memory and said cache memory, and non-accessing instructions for other tasks, wherein said cache memory is disabled in the presence of said non-accessing instructions.

11. The computer system of claim 10 wherein said detection means includes a plurality of gating means, each one of said plurality of gating means having one input connected to one of said plurality of output means and another input for receiving said non-accessing instructions, said detection means also coupled to said output bus.

* * * * *